United States Patent
Greer et al.

(10) Patent No.: US 9,152,809 B1
(45) Date of Patent: *Oct. 6, 2015

(54) SEGMENTED ARCHITECTURE METHOD AND SYSTEM

(71) Applicant: Joingo, LLC, San Jose, CA (US)

(72) Inventors: Russell S. Greer, Los Gatos, CA (US); Stephen S. Boyle, Lincoln, CA (US)

(73) Assignee: Joingo, LLC, San Jose, CA (US)

( * ) Notice: Subject to any disclaimer, the term of this patent is extended or adjusted under 35 U.S.C. 154(b) by 44 days.

This patent is subject to a terminal disclaimer.

(21) Appl. No.: 14/622,817

(22) Filed: Feb. 13, 2015

Related U.S. Application Data

(63) Continuation of application No. 13/775,226, filed on Feb. 24, 2013, now Pat. No. 8,959,656.

(60) Provisional application No. 61/606,393, filed on Mar. 3, 2012.

(51) Int. Cl.
*G06F 21/62* (2013.01)
*H04L 29/06* (2006.01)

(52) U.S. Cl.
CPC .................. *G06F 21/62* (2013.01); *H04L 63/04* (2013.01)

(58) Field of Classification Search
CPC ... G06F 21/62; H01L 63/04; H01L 29/06408; H01L 29/08306; H01L 9/088
See application file for complete search history.

(56) References Cited

U.S. PATENT DOCUMENTS

| | | | | |
|---|---|---|---|---|
| 7,409,452 | B2* | 8/2008 | Ragnet et al. | 709/227 |
| 2002/0111998 | A1* | 8/2002 | Kim | 709/203 |
| 2003/0110169 | A1* | 6/2003 | Zuili et al. | 707/9 |
| 2004/0103202 | A1* | 5/2004 | Hildebrand et al. | 709/229 |
| 2005/0138110 | A1* | 6/2005 | Redlich et al. | 709/201 |
| 2006/0075230 | A1* | 4/2006 | Baird et al. | 713/168 |
| 2007/0204336 | A1* | 8/2007 | Teijido et al. | 726/10 |
| 2008/0065774 | A1* | 3/2008 | Keeler | 709/227 |
| 2008/0215675 | A1* | 9/2008 | Kaminitz et al. | 709/203 |
| 2009/0100529 | A1* | 4/2009 | Livnat et al. | 726/28 |
| 2009/0292930 | A1* | 11/2009 | Marano et al. | 713/189 |
| 2010/0180332 | A1* | 7/2010 | Ben-Yochanan et al. | 726/12 |
| 2011/0314558 | A1* | 12/2011 | Song et al. | 726/28 |

OTHER PUBLICATIONS

Jiang et al., Skip Finite Automaton: A Content Scanning Engine to Secure Enterprise Networks, IEEE Global Telecommunications Conference, Dec. 2010, pp. 1-5.*

* cited by examiner

*Primary Examiner* — Kenneth Chang
(74) *Attorney, Agent, or Firm* — Clause Eight IPS; Michael Catania

(57) ABSTRACT

A method and system for segmented architecture for managing access to electronic documents having private data and public data is disclosed herein. A request for an electronic document is sent to a segmentation server, and the request becomes two queries: one for the public or non-confidential data of the electronic document and one for the private or confidential data of the electronic document. The segmentation server determines if the request is made over a private network or a public network to determine whether private data should be sent in response to the request.

11 Claims, 7 Drawing Sheets

US 9,152,809 B1

SEGMENTED ARCHITECTURE METHOD AND SYSTEM

CROSS REFERENCES TO RELATED APPLICATIONS

The present application is a continuation application of U.S. patent application Ser. No. 13/775,226, filed on Feb. 24, 2013, which claims priority to U.S. Provisional Patent Application No. 61/606,393, filed on Mar. 3, 2012, both of which are hereby incorporated by reference in their entireties.

STATEMENT REGARDING FEDERALLY SPONSORED RESEARCH OR DEVELOPMENT

Not Applicable

BACKGROUND OF THE INVENTION

1. Field of the Invention

The present invention generally relates to the protection of confidential electronic documents. More specifically, the present invention relates to a method and system for determining if a request for an electronic document is transmitted from a secure site.

2. Description of the Related Art

The prior art discusses various ways to maintain the security of confidential information outside of a corporate environment. However, this usually means preventing access to an entire electronic document or report, or encrypting an entire electronic document or report. When a person such as an employee or member of an enterprise desires to view the electronic document, the entire electronic document is decrypted.

The General definitions for terms utilized in the pertinent art are set forth below.

APP is a software application for a mobile phone such as a smart phone.

BLUETOOTH technology is a standard short range radio link that operates in the unlicensed 2.4 gigaHertz band.

Application Programming Interface (API) is a collection of computer software code, usually a set of class definitions, that can perform a set of related complex tasks, but has a limited set of controls that may be manipulated by other software-code entities. The set of controls is deliberately limited for the sake of clarity and ease of use, so that programmers do not have to work with the detail contained within the given API itself.

Code Division Multiple Access ("CDMA") is a spread spectrum communication system used in second generation and third generation cellular networks, and is described in U.S. Pat. No. 4,901,307.

CRM (Customer Relationship Management) is a widely-implemented strategy for managing a company's interactions with customers, clients and sales prospects. CRM involves using technology to organize, automate, and synchronize business processes and the like—principally sales activities, but also business processes and the like for marketing, customer service and technical support.

Direct Inward Dialing ("DID") involves a carrier providing one or more trunk lines to a customer for connection to the customer's private branch exchange ("PBX") and a range of telephone lines are allocated to this line.

FTP or File Transfer Protocol is a protocol for moving files over the Internet from one computer to another.

GSM, Global System for Mobile Communications is a second generation digital cellular network.

Hypertext Transfer Protocol ("HTTP") is a set of conventions for controlling the transfer of information via the Internet from a web server computer to a client computer, and also from a client computer to a web server, and Hypertext Transfer Protocol Secure ("HTTPS") is a communications protocol for secure communication via a network from a web server computer to a client computer, and also from a client computer to a web server by at a minimum verifying the authenticity of a web site.

Internet is the worldwide, decentralized totality of server computers and data-transmission paths which can supply information to a connected and browser-equipped client computer, and can receive and forward information entered from the client computer.

Interactive voice response ("IVR") is a telephone technology in which a user uses a phone to interact with a database to acquire information.

Long Term Evolution ("LTE") is a next generation communication network.

Multimedia messaging service ("MMS") communication is a communication transmitted to and from a mobile phone that includes a multimedia content such as a digital photograph (JPEG), videos, and the like.

Mobile Originated ("MO") is a text message that is sent from a mobile phone.

Mobile Terminated ("MT") is a text message that is sent to a mobile phone.

Public Switch Telephone Network ("PSTN") is a telecommunication system in which networks are inter-connected to allow telephones to communicate with each other throughout the world.

Short Message Service ("SMS") is text messaging communication using a mobile phone or other device to send messages up to 160 characters in length.

Short message peer-to-peer ("SMPP") is a telecommunications protocol for exchanging SMS messages between SMS peer entities.

Simple object access protocol ("SOAP") is a computer network protocol for exchanging information.

Simple mail transfer protocol ("SMTP") is a delivery protocol for email.

A SMS aggregator is an entity that provides connectivity with a mobile phone carrier by offering a SMS gateway to send and receive messages and other digital content.

A SMS Gateway is used to send text messages with or without a mobile phone, and is used by aggregators to forward text messages to mobile phones.

Telephone Consumer Protection Act ("TCPA") of 1991 restricts the use of SMS text messages received by mobile phones, and SMS messages sent without a consumer's consent can violate the TCPA.

Transfer Control Protocol/Internet Protocol ("TCP/IP") is a protocol for moving files over the Internet.

Voice over Internet Protocol ("VoIP") relates to communications transmitted over the Internet such as SKYPE.

URL or Uniform Resource Locator is an address on the World Wide Web.

User Interface or UI is the junction between a user and a computer program. An interface is a set of commands or menus through which a user communicates with a program. A command driven interface is one in which the user enter commands. A menu-driven interface is one in which the user selects command choices from various menus displayed on the screen.

Web-Browser is a complex software program, resident in a client computer, that is capable of loading and displaying text and images and exhibiting behaviors as encoded in HTML (HyperText Markup Language) from the Internet, and also from the client computer's memory. Major browsers include MICROSOFT INTERNET EXPLORER, NETSCAPE, APPLE SAFARI, MOZILLA FIREFOX, and OPERA.

Web-Server is a computer able to simultaneously manage many Internet information-exchange processes at the same time. Normally, server computers are more powerful than client computers, and are administratively and/or geographically centralized. An interactive-form information-collection process generally is controlled from a server computer, to which the sponsor of the process has access.

Wireless Application Protocol ("WAP") is an open, global specification that empowers users with mobile wireless communication devices (such as mobile phones) to easily access data and to interact with Websites over the Internet through such mobile wireless communication device. WAP works with most wireless communication networks such as CDPD, CDMA, GSM, PDC, PHS, TDMA, FLEX, reflex, iDEN, TETRA, DECT, DataTAC, Mobitex and GRPS. WAP can be built on most operating systems including PalmOS, WINDOWS, CE, FLEXOS, OS/9, JavaOS and others.

WAP Push is defined as an encoded WAP content message delivered (pushed) to a mobile communication device which includes a link to a WAP address.

What is needed is a means for ensuring that private information in an electronic document or file is not viewed in a public or otherwise unsecure environment.

BRIEF SUMMARY OF THE INVENTION

The present invention provides a solution ensuring that private information in an electronic document or file is not viewed in a public or otherwise unsecure environment.

One aspect of the present invention is a method for managing access to private information in an electronic document having private information and public information. The method includes requesting at a request site over a first network an electronic document from a database of an enterprise. The electronic document comprises private data and public data. The public data is stored as a subset of the electronic document. The method also includes receiving the request at a patron server. The method also includes determining if the first network is a private network within the enterprise or a public network. The method also includes transmitting the public data to the request site over the first network. The method also includes transmitting the private data to the request site if the first network is a private network within the enterprise.

Another aspect of the present invention is a method for managing distribution of private information in an electronic document to a data capable device. The electronic document has private data and public data. The method includes requesting from a data capable device at a request site over a first network an electronic document from a database of an enterprise. The public data is stored as a subset of the electronic document. The method also includes transmitting the request as a first query for the public data of the electronic document and a second query for the private data of the electronic document. The method also includes transmitting the public data to the data capable device at the request site over the first network. The method also includes determining if the first network is a private network of the enterprise. The method also includes transmitting the private data of the electronic document to the data capable device at the request site if the first network is a private network within the enterprise and transmitting a denial message to the data capable device at the request site if the first network is a public network.

Yet another aspect of the present invention is a method for managing access over a public network to private information in an electronic document having private data and public data. The method includes requesting from a data capable device at a public request site over a public network an electronic document from a database of an enterprise. The electronic document comprises private data and public data. The public data is stored as a subset of the electronic document. The method also includes receiving the request over the public network at a segmentation server. The method also includes transmitting the request from the segmentation server to a patron server as a first query for the public data of the electronic document and a second query for the private data of the electronic document. The method also includes retrieving the subset of the electronic document from the database of the enterprise at the patron server. The method also includes transmitting the public data to the segmentation server. The method also includes transmitting the public data from the segmentation server to the data capable device at the request site over the public network. The method also includes determining at the patron server that the second query for the private data was made over a public network. The method also includes transmitting a denial message for the second query to the data capable device at the request site.

Yet another aspect of the present invention is a method for managing access over a private network to private information in an electronic document having private data and public data. The method includes requesting from a data capable device at an enterprise request site over a private network an electronic document from a database of an enterprise. The electronic document comprises private data and public data. The public data is stored as a subset of the electronic document. The method also includes receiving the request over the private network at a patron server as a first query for the public data of the electronic document and a second query for the private data of the electronic document. The method also includes retrieving the subset of the electronic document from the database of the enterprise at the patron server. The method also includes transmitting the public data from the patron server to the data capable device at the enterprise request site over the private network. The method also includes determining at the patron server that the second query for the private data was made over a private network. The method also includes retrieving the private data of the electronic document from the database of the enterprise at the patron server. The method also includes transmitting the private data of the electronic document to the data capable device at the request site.

Yet another aspect of the present invention is a method for managing access to private information in an electronic document at a patron server. The method includes receiving a request at a patron server from a data capable device at a request site over a first network for an electronic document from a database of an enterprise. The electronic document comprises private data and public data. The public data is stored as a subset of the electronic document. The method also includes defining the request as a first query for the public data of the electronic document and a second query for the private data of the electronic document. The method also includes retrieving the subset of the electronic document from the database of the enterprise at the patron server. The method also includes determining at the patron server if the first network is a private network of the enterprise. The method also includes transmitting the public data of the electronic document and the private data of the electronic document to the data capable device at the request site if the first network is a private network within the enterprise and transmitting only the public data of the electronic document to the data capable device at the request site if the first network is a public network.

Yet another aspect of the present invention is a system for managing access to private information in an electronic document. The system includes at least one public network, at least one private network for an enterprise, a plurality of data capable devices, a database and a patron server. Each of the plurality of data capable devices is located at an individual request site. The database comprises a plurality of electronic documents. The database is located at an enterprise site. Each of plurality of electronic documents comprises private data and public data. The public data is stored as a subset of each of the electronic documents. The patron server is located at the enterprise site and is in communication with the database over the at least one private network. The patron server is configured to receive a request from a data capable device for an electronic document from the database of the enterprise. The patron server is also configured to define the request as a first query for the public data of the electronic document and a second query for the private data of the electronic document. The patron server is also configured to retrieve the subset of the electronic document from the database. The patron server is also configured to determine at the patron server if the request was transmitted over the at least one private network of the enterprise. The patron server is configured to transmit the public data of the electronic document and the private data of the electronic document to the data capable device at the request site if the request was over the at least one private network of the enterprise and transmit only the public data of the electronic document to the data capable device if the request was over the at least one public network.

Having briefly described the present invention, the above and further objects, features and advantages thereof will be recognized by those skilled in the pertinent art from the following detailed description of the invention when taken in conjunction with the accompanying drawings.

DETAILED DESCRIPTION OF THE INVENTION

Figure 1:
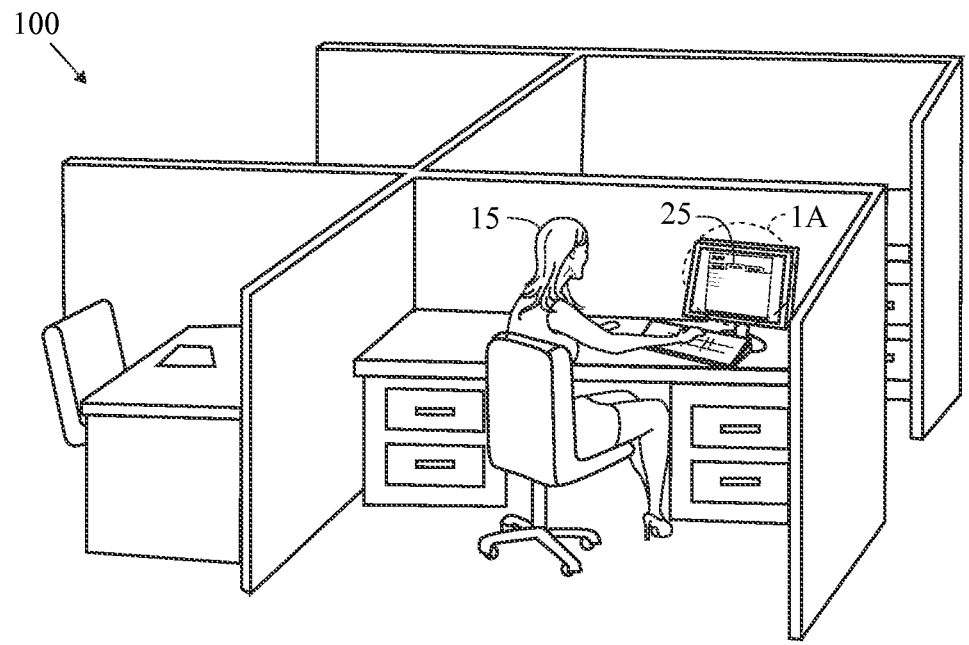
FIG. 1 is an illustration of an employer of an enterprise within the enterprise and accessing an electronic document with private information.
Figure 1A:
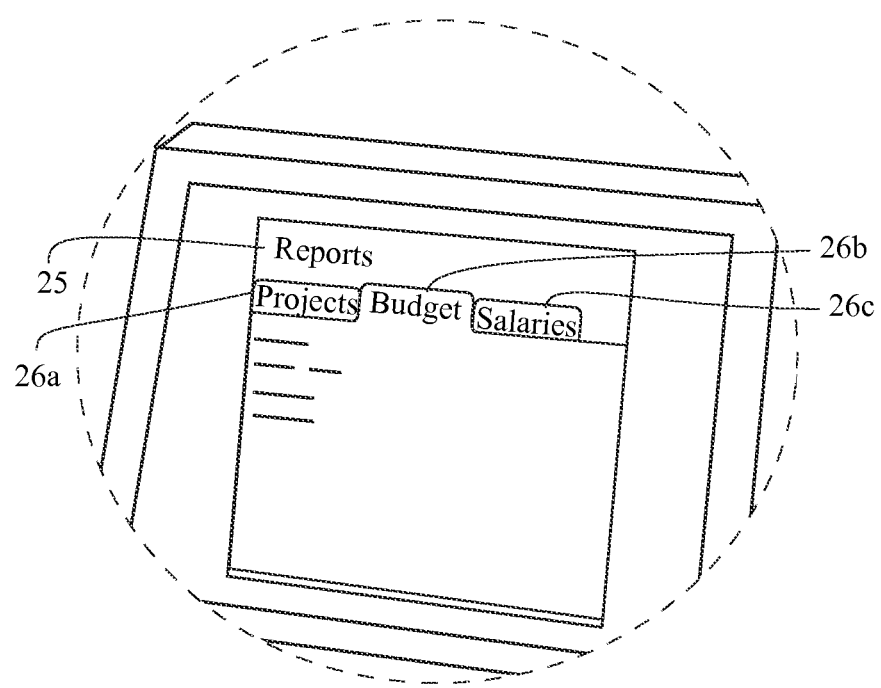
FIG. 1A is an enlarged view of the electronic document with private information of FIG. 1.

As shown in FIGS. 1 and 1A, an individual 15 is within an office of an enterprise 100 at a computer accessing documents. The individual 15 requests an electronic document 25. The request is sent to a patron server and becomes two queries: one for the public or non-confidential data of the electronic document 25 and one for the private or confidential data of the electronic document 25. The segmentation server determines if the request was made over a private network of the enterprise 100 or if the request was made over public network. The public data, which is preferably a subset of the electronic document 25, is sent to the computer since it is public data and non-confidential. For FIG. 1, the segmentation server determines that the request was sent over a private network and the patron server delivers the private data of the electronic document 25 as shown in FIG. 1A. In this example, the public information is the project data 26a, while the private information is the budget data 26b and salary data 26c of the electronic document 25.

Figure 2:
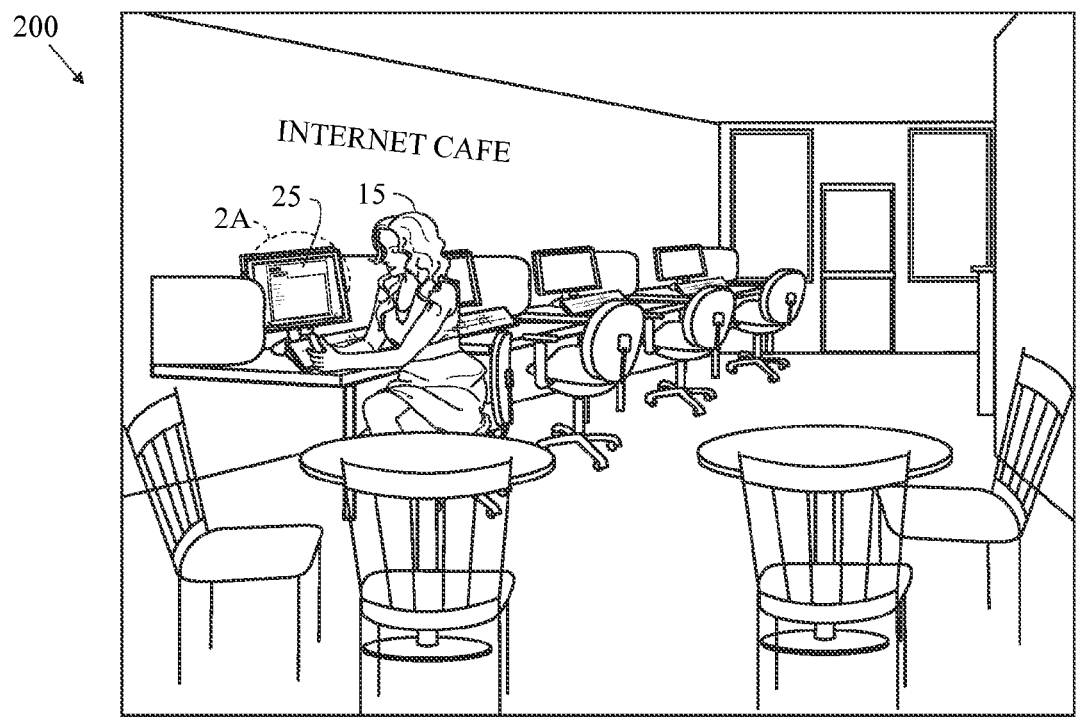
FIG. 2 is an illustration of an employer of an enterprise in a public, non-secure environment and accessing an electronic document with private information.
Figure 2A:
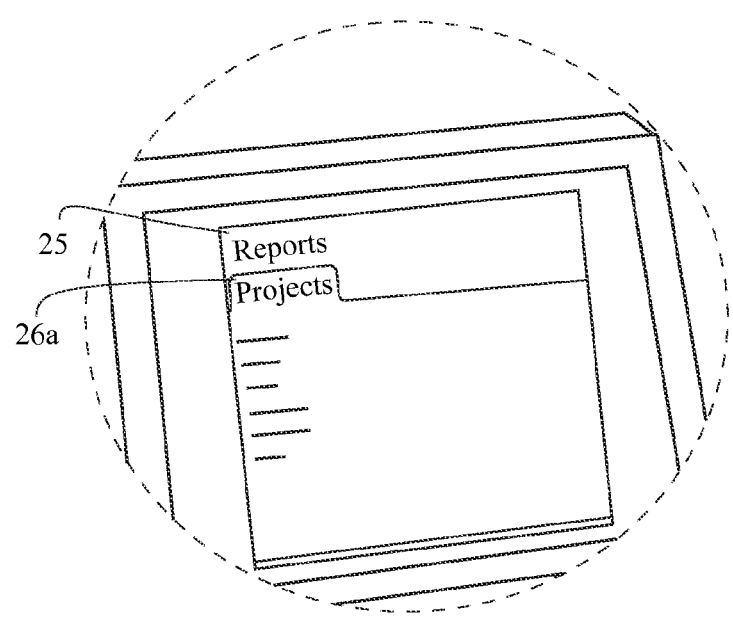
FIG. 2A is an enlarged view of the electronic document with private information, which is not available in this environment, of FIG. 2.

As shown in FIG. 2, an individual 15 is within an Internet café 200, a public forum. This is an unsecured site. The individual 15 sends a request for an electronic document 25. The request is sent to a segmentation server and becomes two queries: one for the public or non-confidential data of the electronic document and one for the private or confidential data of the electronic document. The segmentation server determines if the request was made over a private network of the enterprise or if the request was made over public network. The public data, which is preferably a subset of the electronic document 25, is sent to the computer since it is public data and non-confidential. For FIG. 2, the segmentation server determines that the request was from a public network so only public data is transmitted to the individual as shown in FIG. 2A. The segmentation server may also send a message informing the individual that the request for the full electronic document 25 was denied. In this example, the public information is the project data 26a.

The request may come over data capable communications devices that are wirelessly connected to a network, either private or public.

Figure 3:
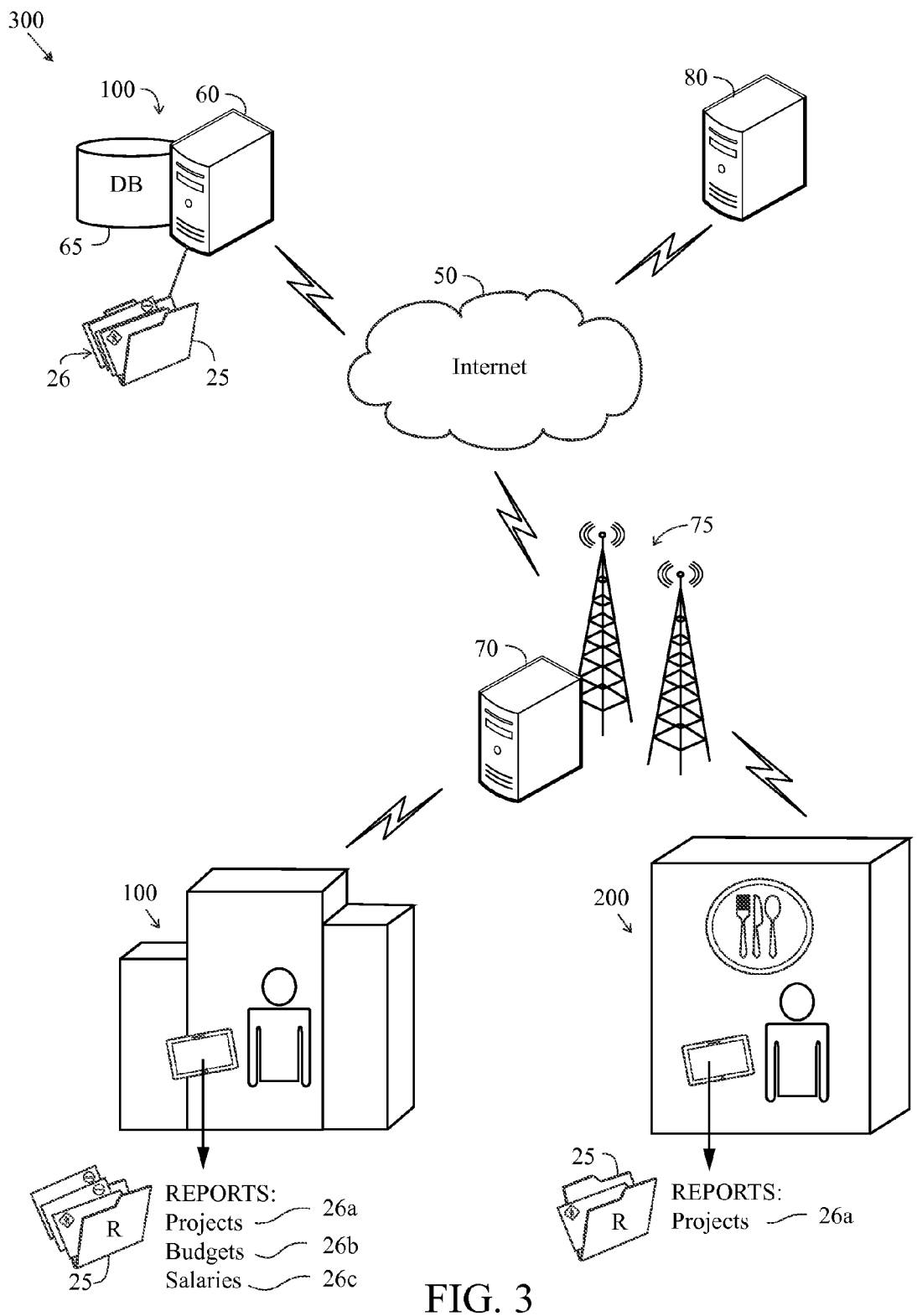
FIG. 3 is a block diagram of the system for a segmented architecture.

FIG. 3 illustrates one embodiment of a system 300 for segmented architecture. The system 300 preferably comprises a segmentation server 80, an enterprise site 100, a patron server 60 of the enterprise having a database 65, a mobile communication service provider 70 with antennas 75 for transmissions over a public mobile communication network to data capable communication devices such as 20a of an enterprise member 15a, and a public forum 200. The database 65 comprises electronic documents 25 that are segmented into public data and private data.

Figure 6:
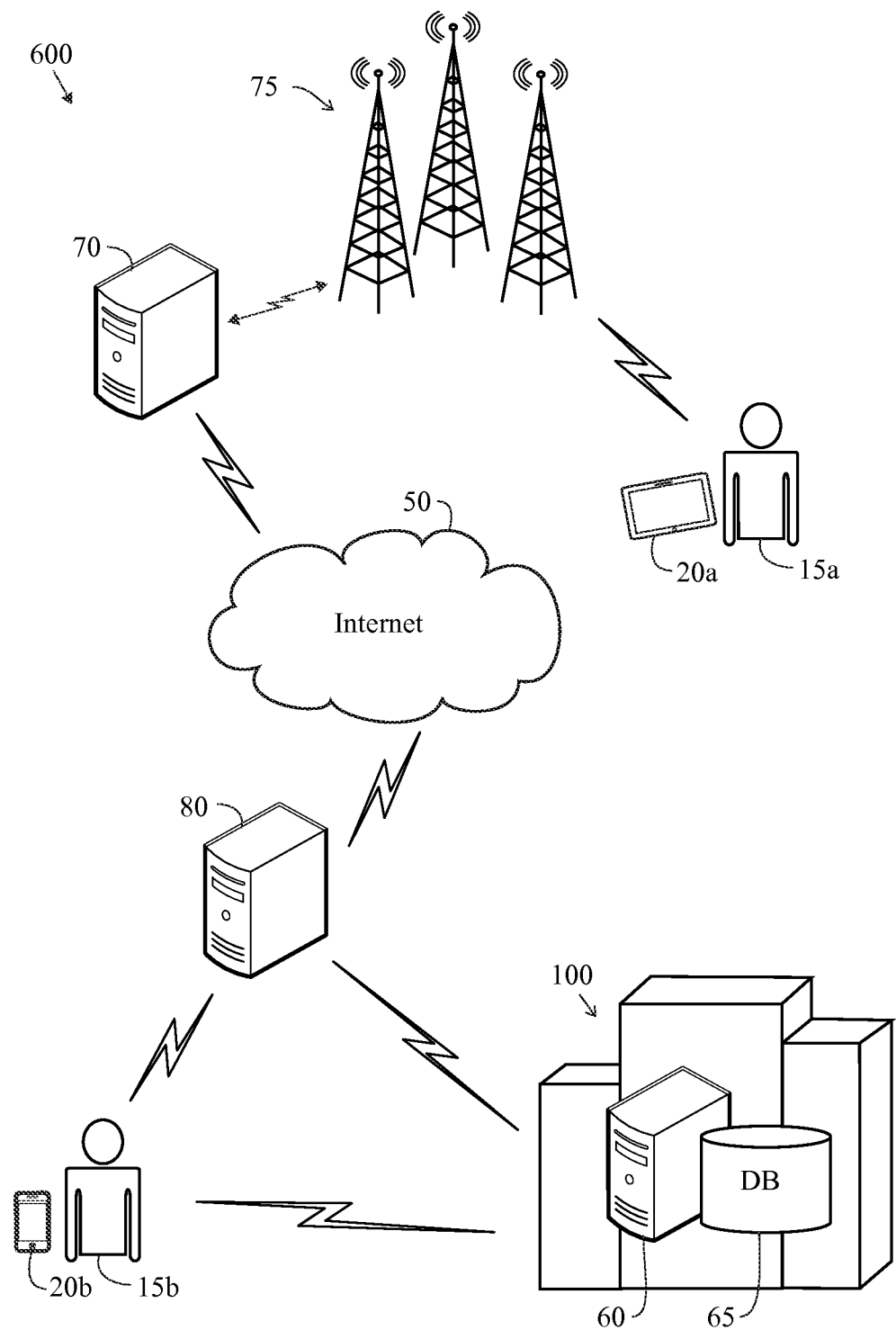
FIG. 6 is a block diagram of the system for a segmented architecture.

FIG. 6 illustrates a preferred embodiment of a system for segmented architecture. The system 600 preferably comprises a segmentation server 80, an enterprise site 100 having a patron server 60 and a database 65, and a mobile communication service provider 70 with antennas 75 for transmissions over a public mobile communication network to data capable communication devices such as 20a of an enterprise member 15a. Another enterprise member 15b with a data capable communication device 20b is within an enterprise 100 and accesses data over a private network.

The data capable communication devices utilized with the present invention preferably include mobile phones, smartphones, tablet computers, PDAs and the like. Examples of smartphones include the IPHONE® smartphone from Apple, Inc., BLACKBERRY® smartphones from Research In Motion, the DROID® smartphone from Motorola Mobility Inc., and many more. Examples of tablet computing devices include the IPAD® tablet from Apple Inc., and the XOOM™ tablet from Motorola Mobility Inc.

A preferred mobile communication device 20 includes an accelerometer a head phone, a microphone, a speak, a GPS chipset, a Bluetooth component, a WiFi component, a 3G/4G component, a BaseBand Processor (for radio control), an applications processor, a JTAG (debugger), a SDRAM memory, a Flash memory, SIM card, LCD display, a camera, a power management circuit and a battery or power source. Those skilled in the pertinent art will recognize that other components may be present in a mobile communication device without departing from the scope and spirit on the present invention.

Each of the interface descriptions preferably discloses use of at least one communication protocol to establish handshaking or bi-directional communications. These protocols preferably include but are not limited to XML, HTTP, TCP/IP, Serial, UDP, FTP, Web Services, WAP, SMTP, SMPP, DTS, Stored Procedures, Import/Export, Global Positioning Triangulation, IM, SMS, MMS, GPRS and Flash. The databases used with the system preferably include but are not limited to MSSQL, Access, MySQL, Progress, Oracle, DB2, Open Source DBs and others. Operating system used with the system preferably include Microsoft 2010, XP, Vista, 200o Server, 2003 Server, 2008 Server, Windows Mobile, Linux, Android, Unix, I series, AS 400 and Apple OS.

The underlying protocol at a server, is preferably Internet Protocol Suite (Transfer Control Protocol/Internet Protocol ("TCP/IP")), and the transmission protocol to receive a file is preferably a file transfer protocol ("FTP"), Hypertext Transfer Protocol ("HTTP"), Secure Hypertext Transfer Protocol ("HTTPS") or other similar protocols. The transmission protocol ranges from SIP to MGCP to FTP and beyond. The protocol at the server is preferably HTTPS.

The enterprise can be any type of organization that desires to conduct a mobile marketing campaign or similar mobile marketing to end users. The enterprise can be a business like Exxon, Apple, Nordstrom or the like. The enterprise can be a non-profit or charity, like the American Red Cross. The enterprise can be a government agency like FEMA. The enterprise can be a political party. The enterprise can be an organization like the American Medical Association. Those skilled in the pertinent art will recognize other types of enterprises that can use the present invention.

A mobile communication service provider (aka phone carrier) of the customer such as VERIZON, AT&T, SPRINT, T-MOBILE, and the like mobile communication service providers, provide the communication network for communication to the data capable communication device of the customer.

Figure 4:
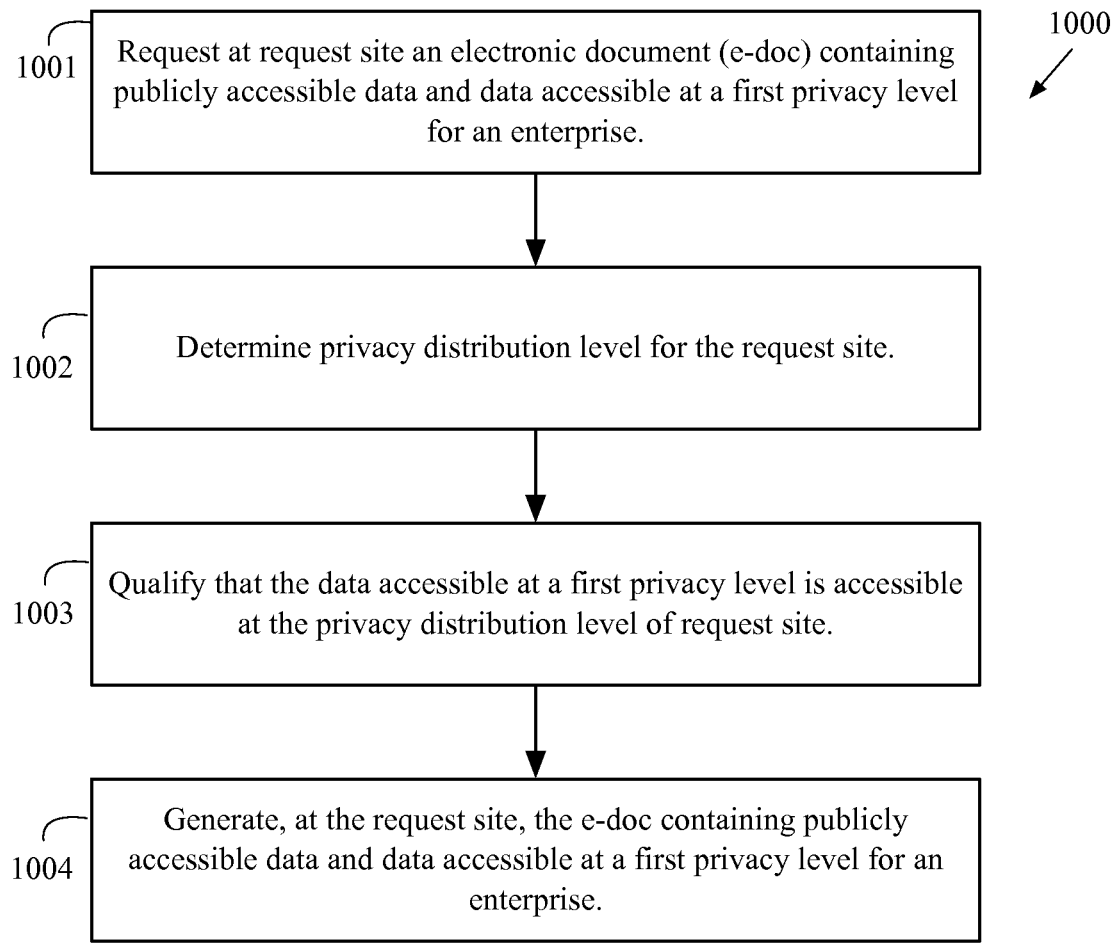
FIG. 4 is a flow chart of a method for a segmented architecture.

An embodiment of a method 1000 for managing access to private information in an electronic document consisting of both private information and public information is shown in FIG. 4. A request for an electric document (e-document) is sent from a request site at block 1001. The data within the e-document is both public and private data, the private data having a first privacy level for an enterprise. The request is preferably sent to a patron server. The request becomes two queries: one for the public or non-confidential data of the electronic document and one for the private or confidential data of the electronic document. At block 1002, the privacy distribution level is determined for the request site. The privacy level assignment controls accessibility to private and/or highly confidential information contained within an e-document. The determination is preferably made at a patron server. The patron server determines if the request was made over a private network of the enterprise or if the request was made over public network. The public data, which is preferably a subset of the electronic document, is sent to the data capable communication device since it is public data and non-confidential. At block 1003, the patron server determines that the request was sent over a private network (preferably the request is made from within the enterprise) since the data accessible at a first privacy level is qualified to be accessible at the privacy distribution level of the request site. At block 1004, the e-document containing both public and private data is generated at the request site since the request was sent over a private network within the enterprise and the data is accessible at the first privacy level for the enterprise.

Figure 5:
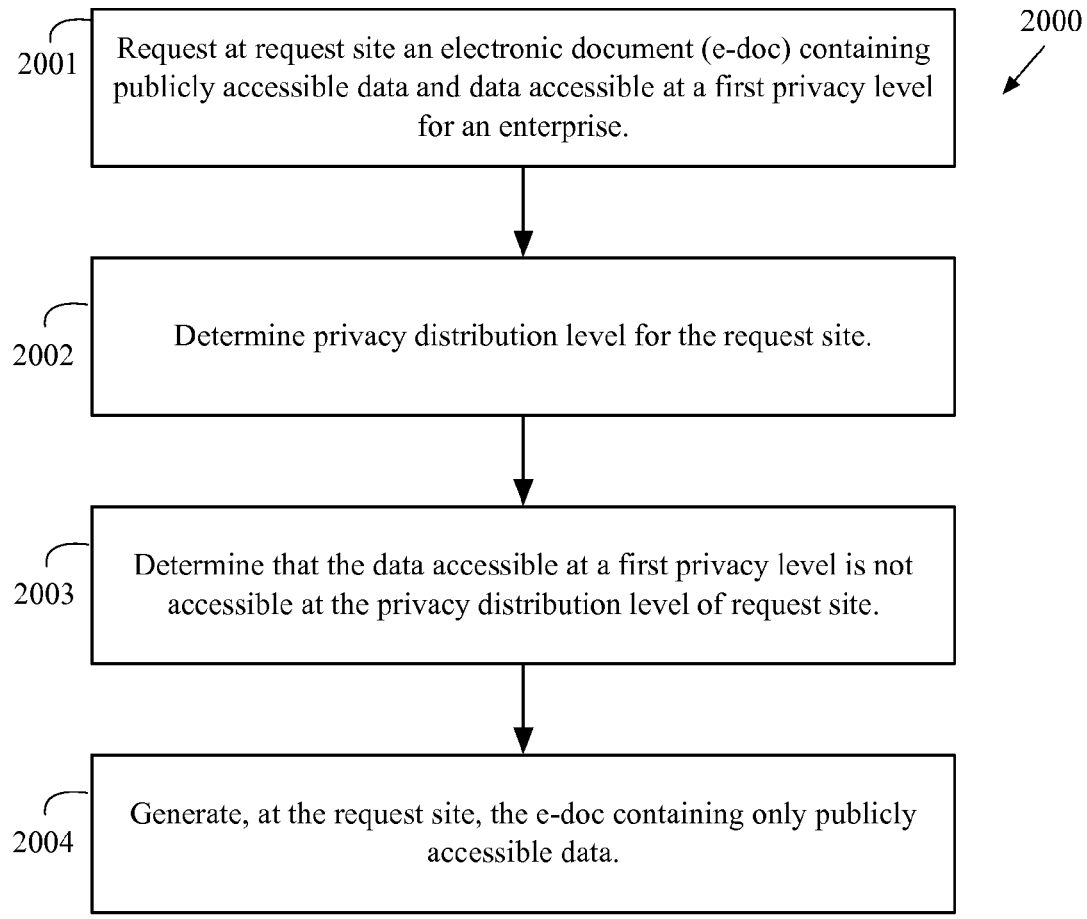
FIG. 5 is a flow chart of a method for a segmented architecture.

Another embodiment of a method 2000 for managing access to private information in an electronic document consisting of both private information and public information is shown in FIG. 5. A request for an e-document is sent from a request site at block 2001. The data within the e-document is both public and private data, the private data having a first privacy level for an enterprise. The request is preferably sent to a patron server. The request becomes two queries: one for the public or non-confidential data of the electronic document and one for the private or confidential data of the electronic document. At block 2002, the privacy distribution level is determined for the request site. The determination is preferably made at a patron server. The patron server determines if the request was made over a private network of the enterprise or if the request was made over public network. The public data, which is preferably a subset of the electronic document, is sent to the data capable communication device since it is public data and non-confidential. Then, at block 2003, the data accessible at a first privacy level is determined not to be accessible at the privacy distribution level of a request site since the request was sent over a public network. At block 2004, since the privacy levels did not correspond, as the request site did not have the appropriate privacy level assignment, the e-document generated on the data capable communication device at the request site only contains publicly accessible data.

Figure 7:
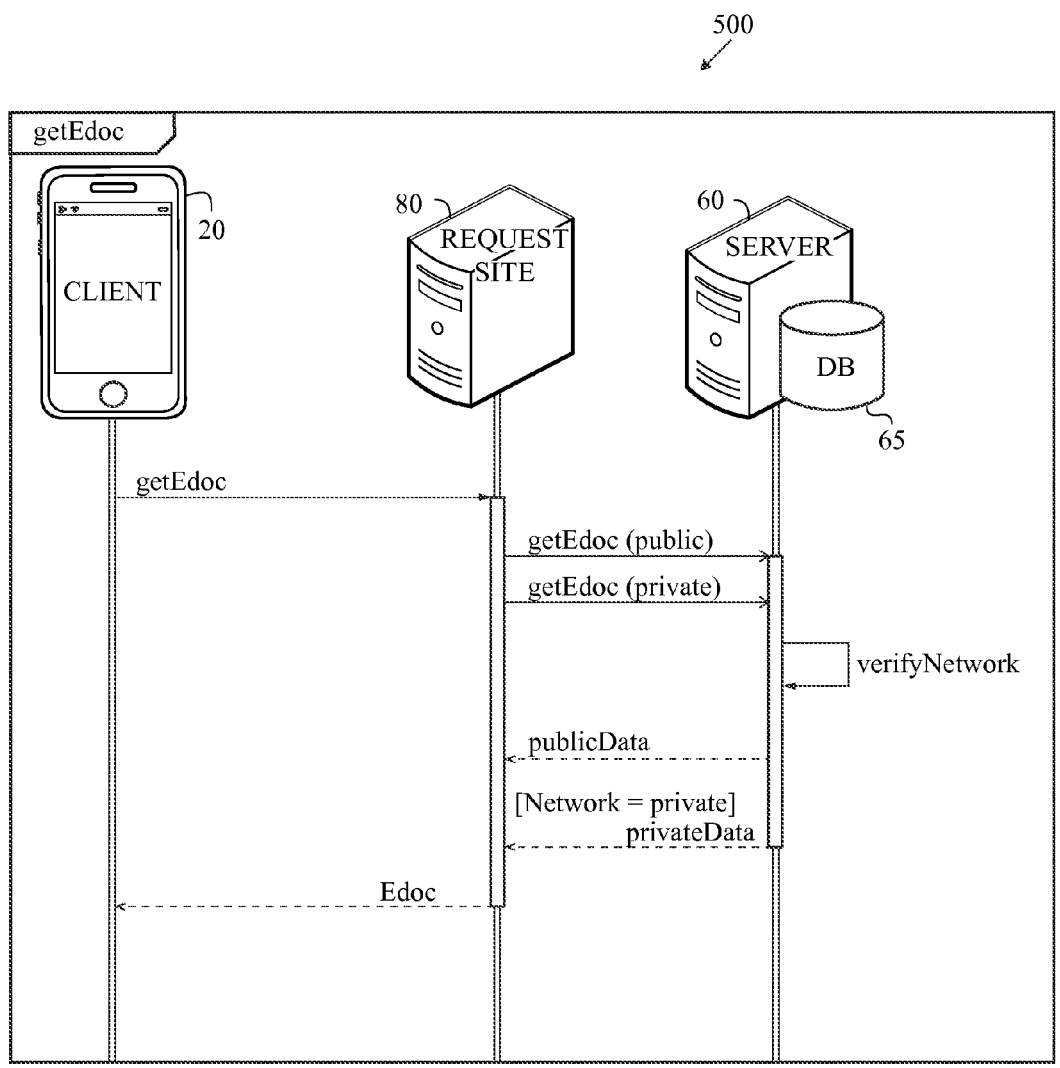
FIG. 7 is a sequence diagram of communications in a segmented architecture.

FIG. 7 illustrates a sequence diagram 500 of communications within a system for segmented architecture. A member of an enterprise accesses a resident mobile application on her client device 20 at a request site. The device 20 is one of a mobile device such as smartphone or table computer, or a desktop or laptop computer. The member transmits a request for an electronic document from the enterprise database 65. The data within the electronic document 25 is both public and private data, the private data having a first privacy level for an enterprise. The request is sent to a segmentation server 80 over a network. The request becomes two queries: one for the public or non-confidential data of the electronic document and one for the private or confidential data of the electronic document. The privacy distribution level is determined for the request site. The privacy level assignment controls accessibility to private and/or highly confidential information contained within an electronic document. The determination is preferably made at the segmentation server 80. The segmentation server 80 determines if the request was made over a private network of the enterprise or if the request was made over public network.

One way of determining if a request is made over a private or public network is to analyze an IP address transmitted with the request. If the IP address is recognized as being an IP address of the enterprise, then the segmentation server 80 determines that request is made over a private network. If the IP address is not recognized as being an IP address of the enterprise, then the segmentation server 80 determines that request is made over a public network.

The request for the electronic document is sent to the patron server 60, which accesses a database 65 containing the electronic document 25. Preferably, the request is sent as two different requests: one for the public data of the electronic document 25 and if applicable, one for the private data of the electronic document.

The public data, which is preferably a subset of the electronic document 25, is sent to the data capable communication device 20 since the public data is public data and non-confidential. If the segmentation server 80 determines that the request was sent over a private network (preferably the request is made from within the enterprise), then the private data of the electronic document 25 is retrieved from the database 65 since the data accessible at a first privacy level is qualified to be accessible at the privacy distribution level of the request site. The electronic document 25 containing both public and private data is sent to the segmentation server 80 and then generated on the client device 20 since the request was sent over a private network within the enterprise and the data is accessible at the first privacy level for the enterprise.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes modification and substitutions of equivalents may be made therein without departing from the spirit and scope of this invention which is intended to be unlimited by the foregoing except as may appear in the following appended claim. Therefore, the embodiments of the invention in which an exclusive property or privilege is claimed are defined in the following appended claims.

We claim as our invention:

1. A method for managing access to private information in an electronic document having private information and public information, the method comprising:
   receiving at a patron server a request for an electronic document from a data capable communication device at a request site, the electronic document comprising publicly accessible data and data accessible at a first privacy level for an enterprise;
   segmenting the request for the electronic document at the patron server into a request for public data and a request for private data;
   determining a privacy distribution level for the request site at the patron server, wherein determining the privacy distribution level for the request site comprises analyzing an Internet Protocol (IP) address transmitted with the request to determine if the request is transmitted over a public network or a private network based on recognition of the IP address as controlled by the enterprise, and/or determining a location of the request site using Global Positioning (GPS) or a tower triangulation mechanism;
   generating the electronic document in a form for the privacy distribution level for the request site; and
   transmitting the electronic document to the data capable communication device from the patron server, the electronic document comprising the publicly accessible data and the data accessible at the privacy distribution level for the request site.

2. The method according to claim 1 wherein the request site is within the enterprise or a secure home office site.

3. The method according to claim 1 wherein the data capable communication device is a tablet computer or a mobile phone.

4. The method according to claim 1 wherein the data capable communication device comprises a mobile resident app configured to transmit requests for electronic documents comprising publicly accessible data and data accessible at a first privacy level for an enterprise, and the mobile resident app configured to display data in an electronic document according to a privacy distribution level for the request site.

5. The method according to claim 1 wherein the request site is a public forum.

6. The method according to claim 1 wherein the request site is a non-enterprise facility.

7. The method according to claim 1 wherein the electronic document only comprises the publicly accessible data.

8. A system for managing access to private information in an electronic document having private information and public information, the system comprising:
   a plurality of mobile data capable communication devices comprising a mobile resident app and a transmitter;
   a segmentation server configured to receive a request for an electronic document from at least one of the plurality of mobile data capable communication devices located at a request site, the electronic document comprising publicly accessible data and data accessible at a first privacy level for an enterprise, the segmentation server further configured to segment the request for the electronic document into a request for public data and a request for private data;
   wherein the segmentation server is configured to determine a privacy distribution level for the request site, wherein determining the privacy distribution level for the request site comprises analyzing an Internet Protocol (IP) address transmitted with the request to determine if the request is transmitted over a public network or a private network based on recognition of the IP address as controlled by the enterprise, and/or determining a location of the request site using Global Positioning (GPS) or a tower triangulation mechanism, the segmentation server configured to qualify that the data accessible at the first privacy level is accessible at the privacy distribution level of the request site, wherein determining that the first privacy level is accessible comprises analyzing an IP address of the request from the mobile data capable communication device, the segmentation server configured to generate the electronic document according to the privacy distribution level for the request site, and the segmentation server configured to transmit to the at least one of the plurality of mobile data capable communication devices the electronic document comprising the data accessible at the privacy distribution level for the request site.

9. The system according to claim 8 wherein the request site is one of a public forum, a non-enterprise facility, the enterprise, and a secure home office site.

10. The system according to claim 8 further comprising a database at an enterprise site, the database comprising a plurality of electronic documents.

11. The system according to claim 8 wherein the data capable communication device is a tablet computer or a mobile phone.

\* \* \* \* \*